March 21, 1950     A. R. LE BLANC     2,501,182
WORK SPREADER FOR HIDE AND SKIN TREATING MACHINES
Filed July 9, 1948
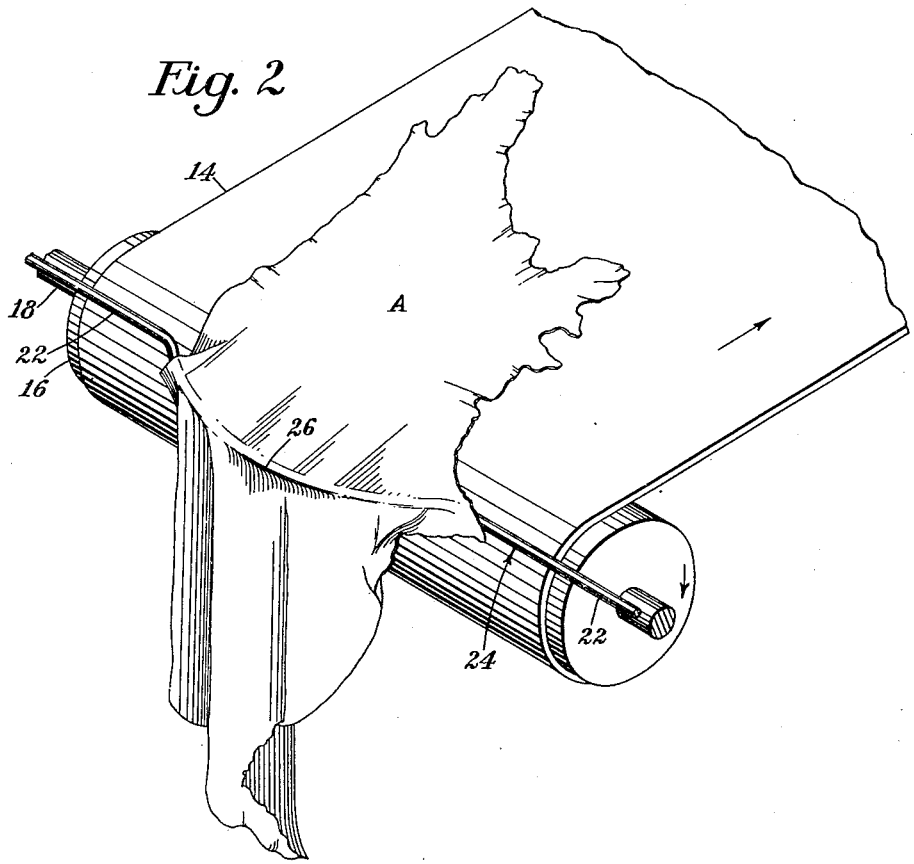
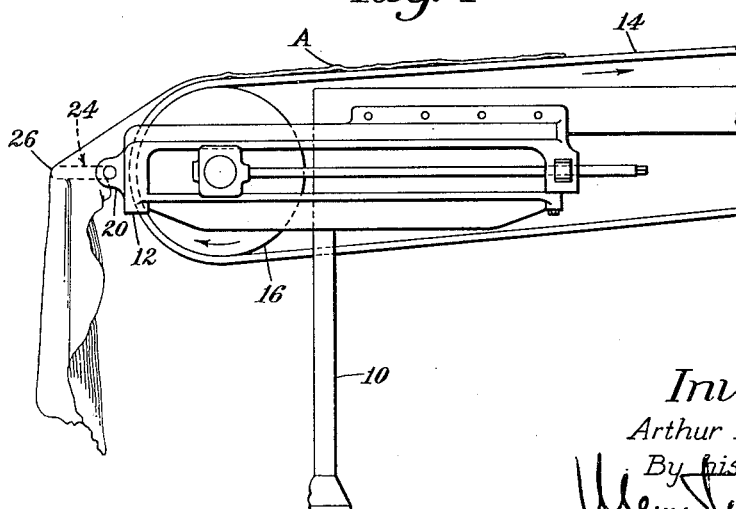
Inventor
Arthur R. LeBlanc
By his Attorney Patented Mar. 21, 1950

2,501,182

UNITED STATES PATENT OFFICE 2,501,182

WORK SPREADER FOR HIDE AND SKIN TREATING MACHINES

Arthur R. Le Blanc, Salem, Mass., assignor to United Shoe Machinery Corporation, Flemington, N. J., a corporation of New Jersey Application July 9, 1948, Serial No. 37,805

7 Claims. (Cl. 69—1)

This invention relates to hide or skin treating machines. More particularly, the invention is concerned with providing means whereby an operator of such a machine is assisted in feeding the normally flabby and irregularly shaped workpieces in spread-out condition for further treatment.

In the commercial processes of converting hides or skins into leather a number of different machine operations are performed on the individual workpieces. Whether a particular treatment is to be chemical or mechanical in nature, it is essential to more uniform and generally improved results that each workpiece be presented to, or be supported on, the machine in evenly spread-out condition and have no turned-under or overlapping marginal portions.

A feeding member having a movable work feeding surface such as that provided by a conveyor belt or drum may be used to support consecutively presented limp hides or skins for treatment, but it has always proved tedious, time-consuming and hence expensive initially to unfold and properly place each individual workpiece upon such supporting surface. It must be remembered that a workpiece does not tend to lie flat and that it is of very irregular configuration, the hide or skin having been removed from a barrel-like body, and it may have been made even more irregular by reason of flaying damages or the removal of imperfections. As a consequence of this peculiar shape and the fact that during treatment stages workpieces may take on widely varying conditions of being dank, flaccid, tacky or oily, it is readily appreciated that the problem of satisfactorily handling them, particularly in connection with evenly spreading them on any feeding mechanism, is such as to divert the operator's attention from the more important actual treatment of the workpiece by the machine. An example of one type of machine for treating hides and skins (for performing putting-out operations) is shown with its feeding surface in United States Letters Patent No. 2,366,242, issued to David Edgar on January 2, 1945.

An object of this invention is to provide in a machine having a feeding member including moving surface for supporting a workpiece such as a hide or skin in spread-out condition, a spread-out condition, a spreader that will assist the operator in presenting the workpiece thereto.

In accordance with this object a feature of the invention resides in the provision in a hide or skin treating machine having a supporting surface for carrying a spread-out workpiece to a treatment zone, of a work spreader in advance of said surface, said spreader being of such configuration as to engage and spread successive portions of a workpiece being placed on the supporting surface.

A further feature of the invention is a work spreader taking the form of a stationary safety member extending transversely of the loading end of a conveyor belt.

The features of the invention will now be described in detail in connection with an illustrative embodiment, reference being had to the accompanying drawings, in which:

Fig. 1 is a view in side elevation of the loading end of a machine for treating hides and skins, the machine being provided with one form of novel work spreader; and Fig. 2 is a perspective view of a portion of the loading end of the machine shown in Fig. 1, the work spreader being in operative engagement with half of a skin of hide, commonly known as a "side."

The loading end of the machine (Fig. 1) is mounted on spaced standards 10 each of which also serves to support an idler pulley structure generally designated as 12. A broad continuous work carrying belt 14 (Figs. 1 and 2) passes upwardly over a pulley 16 rotatable on a shaft 18 and thence away to the work treating zone (not shown) of the machine. Ears 20 (only one of which is shown in Fig. 1) respectively project from the two pulley structures 12 to receive opposite end portions 22 (Fig. 2) of a smooth, bar-shaped member or work spreader generally designated as 24, disposed transversely of the path of the conveyor surface 14. This bar or work spreader is held stationary and adjacent to the conveyor belt 14, preferably being supported at about waist height to accommodate an operator in feeding the work as will hereinafter be described.

If desired, any convenient means may be employed in lieu of the ears 20 to hold the work spreader 24 in relatively fixed position with respect to the conveyor surface 14 though sometimes, depending on the nature of the work treatment or the type of stock being handled, it is desirable in a machine to so mount the work spreader near the pulley 16 that the spreader 24 may have an upward pivotal movement for alleviating excessive strain on a workpiece being drawn thereover.

An important feature of the work spreader 24, if it be in the preferred form of a simple bar as illustrated, or in the form of a flat or non-level shelf-like device with a heavier structure (not shown), is that its advance face has a convex curve disposed for frictional engagement with the underside of a workpiece to be treated. This longitudinal curvature away from the loading zone A results in the work spreader 24 bulging in its central portion 26 over which the thicker backs and shoulders of workpieces are likely to pass, while the divergent end portions 22 are nearer to the work loading zone A. Preferably the work spreader is of symmetric configuration, and its leading edges are arranged in advance of the loading zone A partially to support successive portions of a workpiece against the pull of gravity.

In feeding a workpiece to the machine for treatment the operator will normally occupy a position such that he may face toward and, at the proper time, lean his waist against the convex portion 26 of the work spreader, the latter safeguarding him from danger of injury due to contact with the feeding mechanism. He will first throw or place an end portion of a workpiece over the bar 24 and onto the loading zone A where the belt 14 will make effective frictional contact with the underside of said portion, and the remainder of the workpiece will be allowed to hang limp over, and in contact with, the bar. As the belt is driven in the direction shown it will draw the workpiece toward the treatment zone of the machine and the work spreader 24 will cause the spreading or flaring action desired. This spreading action may be augmented or shifted in any given case by the operator who may retard passage of the workpiece by merely pressing lightly with his waist or hands on the workpiece portions being drawn over the spreader.

The effect of the convexly curved advance border 26 of the work spreader is to engage the underside of a workpiece progressively from head to tail, flaring all portions outwardly. Accordingly, the thicker and least pliable portions of a workpiece will rub over the spreader's bulging rim and be deflected away from the work-moving surface momentarily so as to allow the thinner, more supple and wrinkled marginal portions of the workpiece to be spread outwardly (as seen in Fig. 2) along the less arcuate ends of the work spreader.

Since the advance work-contacting rim as well as the rest of the work spreader is stationary, an operator may with safety and without paying particular attention, grasp opposite side margins of a workpiece suspended from the spreader to stretch the hide or skin widthwise in any desired area. It will also be appreciated, especially where a feeding path is long, that a retarding of the trailing margin of the workpiece just before it is to pass over the work spreader will distribute the entire irregular skin or hide more evenly on the conveying surface and enable the operator conveniently to guide or shift the path of the work sidewise on the conveyor.

Having thus described the invention, what I claim as new and desire to secure by Letters Patent of the United States is:

1. In a machine for treating hides and skins, the combination with a feeding member having a continuous work moving surface including a loading zone, of a work spreader in the form of a bar adjacent to said zone and extending transverse to the direction of movement of said surface and having an intermediate portion curved away from said zone with end portions nearer to said zone positioned to engage the marginal portions of a workpiece.

2. In a machine for treating hides and skins, the combination with feeding mechanism including a work moving surface having a loading zone, of a motionless work spreader adjacent said zone for aiding an operator in placing a workpiece thereon, the spreader presenting a smooth advance work engaging face to the underside of the workpiece drawn thereover, said face having a centrally convex contour disposed transversely of said surface whereby the underside of the workpiece is progressively wiped outwardly.

3. In a hide and skin treating machine, the combination with feeding means including a movable surface for conveying a workpiece over a path, of a work spreader arranged in advance of said path and contiguous with said surface, the work spreader having an arcuate work engaging configuration for flaring the underside of the workpiece progressively whereby the latter is introduced to said surface in spread-out condition.

4. In a machine for operating on hides and skins, the combination with feeding mechanism including a movable surface for conveying a workpiece over a path, of a work spreader for guiding the workpiece onto said surface, the work spreader being disposed transversely of said path and including a trailing edge adjacent to the surface and an advance rim of rounded exterior arranged to be contacted by the workpiece when pulled thereover, the lengthwise curvature of said rim serving to wipe the entire underside of the workpiece outwardly.

5. A machine for treating hides and skins comprising feeding mechanism including a surface for moving a workpiece to its treatment zone, and a work spreader pivotally mounted in advance of said zone and adjacent said surface, the work spreader having a symmetric configuration to engage and flare outwardly successive portions of the workpiece as it is being placed onto and moved by said surface.

6. In a machine for treating hides and skins, the combination with a feeding member having a continuous work moving surface including a loading zone, of a work spreader adjacent to said zone and extending transverse to the direction of movement of said surface, said spreader including an intermediate portion curved away from said zone to partially support a workpiece and end portions nearer to said zone which are positioned to engage the marginal portions of the workpiece.

7. A machine for treating hides and skins comprising a feeding member having a work moving surface with a loading zone, and work spreading means having diverging leading edges arranged partially to support a workpiece and flare out its marginal portions when placed on and carried by said feeding member.

ARTHUR R. LE BLANC.

No references cited.